(12) United States Patent
Thomas et al.

(10) Patent No.: US 7,264,385 B2
(45) Date of Patent: Sep. 4, 2007

(54) WIRELESS CONTROL OF WHEEL ILLUMINATION FUNCTIONS

(75) Inventors: Mark Thomas, Cupertino, CA (US); Joel Osias, San Jose, CA (US)

(73) Assignee: SET Industries Corporation, Fremont, CA (US)

( * ) Notice: Subject to any disclaimer, the term of this patent is extended or adjusted under 35 U.S.C. 154(b) by 99 days.

(21) Appl. No.: 10/851,551

(22) Filed: May 21, 2004

(65) Prior Publication Data

US 2005/0036297 A1 Feb. 17, 2005

Related U.S. Application Data

(60) Provisional application No. 60/494,465, filed on Aug. 11, 2003.

(51) Int. Cl.
*F21W 101/02* (2006.01)

(52) U.S. Cl. .......... 362/500; 362/276; 362/464; 362/545; 362/802

(58) Field of Classification Search .......... 362/599, 362/233, 276, 42, 464, 540, 543–545, 231, 362/802, 500
See application file for complete search history.

(56) References Cited

U.S. PATENT DOCUMENTS

| 6,030,106 A * | 2/2000 | Johnson ............ 362/500 |
| 6,789,928 B2 * | 9/2004 | Khan ............ 362/500 |
| 2005/0099820 A1 * | 5/2005 | Cooper ............ 362/500 |

* cited by examiner

*Primary Examiner*—Laura Tso
(74) *Attorney, Agent, or Firm*—Blakely, Sokoloff, Taylor & Zafman, LLC

(57) ABSTRACT

A wheel lighting/illumination system is disclosed that incorporates a wireless link to accomplish a number of functions including controlling lighting elements that are coupled to, or are part of, a wheel.

41 Claims, 4 Drawing Sheets

WIRELESS CONTROL OF WHEEL ILLUMINATION FUNCTIONS

CLAIM OF PRIORITY

This application is related to, and hereby claims the benefit of, provisional application No. 60/494,465 filed Aug. 11, 2003.

FIELD

Embodiments of the invention pertain to automotive aesthetics and safety, and more particularly to the wireless control of a wheel lighting and/or illumination system.

BACKGROUND

Automobile enthusiasts and the companies that provide parts to the automotive enthusiast market are continually looking for ways to personalize and accessorize automobiles. Common accessories include enhanced aerodynamic body work, decorative wheels, tuned exhaust systems, and similar vehicle flair or "bling." Enthusiasts further customize with after market paint and color schemes and with gas discharge tubes to create an under-body glow. Further still, an enthusiast can add lighting and/or illumination to the wheels to enhance the aesthetics of the wheels in lower light environments. Installing this final form of customization, however, is not a trivial task.

Operational challenges associated with wheel lighting and illumination system include providing energy to the lighting elements, securely mounting the components to the wheel, and controlling the operation of the lighting or illumination system. Existing lighting and illumination systems employ a plurality of lamps that are individually mounted on the wheel rim. The lamps are connected to a control module that is mounted on the wheel inside the tire. The lamps are connected to a receiver or power source via shared wires or dedicated wires that are routed through the wheel to the inner tire chamber. The receiver can cause the lights to flash on and off in unison or sequentially and control the amount of current to the lamps to modulate the intensity of the light. Integral to this design is a switch that activates the system when the vehicle wheel is rotating, presumably to preserve battery charge when the vehicle is not in use.

Locating a control module on a wheel inside a tire is particularly challenging in that the control module must be connected to the lighting elements and power supply. For either case, there must be a connection through the wheel. The same enthusiasts that would be interested in such a lighting or illumination system would most likely be deterred from using such a system if it required, for example, drilling holes in the wheel to route wires. Further, without additional control features, the most sophisticated operation possible by the wheel lighting or illumination system is based on a pre-programmed scheme or dependent upon movement in the wheel. There is no way for the enthusiast to manually alter the lighting while, for example, driving.

DETAILED DESCRIPTION

Figure 1:
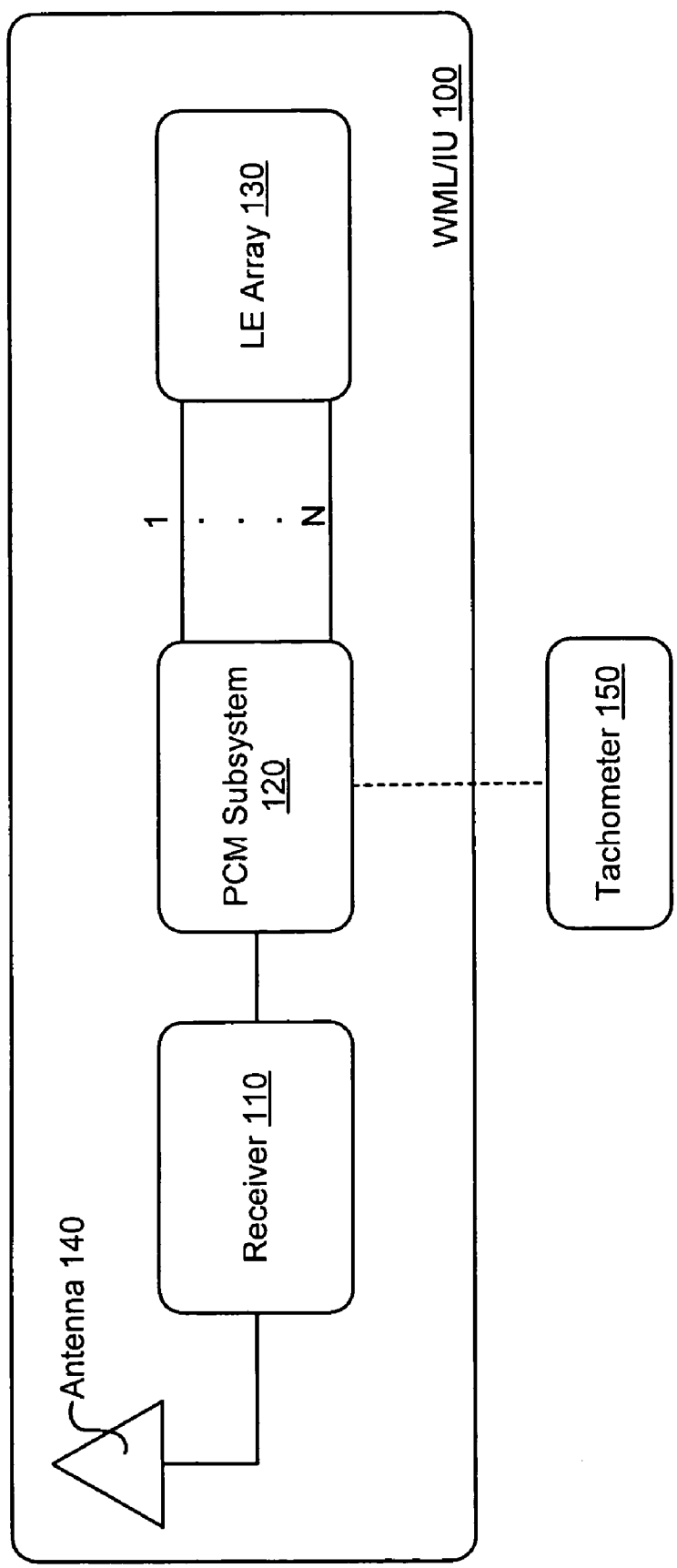
FIG. 1: block diagram an embodiment of a wheel lighting/illumination unit with unidirectional wireless control

Embodiments of a wireless wheel lighting/illumination control system will be described. Reference will now be made in detail to a description of these embodiments as illustrated in the drawings. While the embodiments will be described in connection with these drawings, there is no intent to limit them to drawings disclosed herein. On the contrary, the intent is to cover all alternatives, modifications, and equivalents within the spirit and scope of the described embodiments as defined by the accompanying claims.

Briefly, an embodiment of the invention is a wheel lighting and/or illumination system with wireless control. The wheel-mounted lighting and illumination systems include wireless receivers to receive control information from a transmitter. The control information can include, among other features, control of light or illumination intensity, color, and strobe pattern. The control information is provided by a transmitter that can be controlled manually by a user or automatically. For example, the transmitter can be configured to automatically accept input from, among other elements, turn signals, brake lights, emergency blinkers, fog lights, and back-up signals, to extend the signaling capability of the elements. The wireless link may further be bi-directional to enhance the capabilities of the wheel lighting/illumination system.

As introduced, automobile enthusiasts are constantly looking for ways to customize and personalize their automobiles. Wheel lighting/illumination systems further appeal to those drivers interested in the safety of their vehicles, and the increased safety possible through the wheel lighting/illumination extended signaling. Embodiments will be discussed for which both the automobile enthusiast and the safety enthusiast will be satisfied.

There are two types of systems that may be implemented with lighting elements in the rotating reference frame of the wheel, i.e. wheel lighting systems and wheel illumination systems. In accordance with one embodiment, one or more light source assemblies are positioned within the rotating reference frame of a wheel. As used herein, the term "rotating reference frame of a wheel" includes any surfaces that are rotating at the same rotational frequency as the wheel and around the same axis as the wheel. The rotating reference frame includes, for example, the wheel, the tire, the lugs, the lug nuts, the hub, the valve stem, the drum, the hat, and the brake rotor. The rotating reference frame further includes devices attached to the wheel or other elements of the rotating reference frame with bearing floating surfaces that allow some portion of the device to rotate at a different rotational frequency than the wheel or in the extreme case not rotate at all.

Lighting elements include light emitting diodes ("LEDs"), neon lights, filament bulbs, lasers, or any other source of light as is well known in the electrical arts. Specifically, a wheel lighting system displays lighting elements on a wheel. The lighting elements can be viewed directly without any optical path impairments between the source and the eye of the observer. In an embodiment, the lighting elements produce light in the visible portion of the light spectrum. Lighting elements may also emit light that is in the invisible portion of spectrum for various other purposes. For example, light in the invisible spectrum may create indirect lighting by ultraviolet induced fluorescence.

Additionally, a wheel illumination system illuminates the wheel using the same types of, but alternatively located or aimed, lighting elements. A unique feature of the illumination system is that the lighting elements are not openly displayed. The optical output power from the lighting elements is directed to the outboard surfaces of the wheel (and other surfaces that may be attached to the wheel such as hubcaps, beauty rims, wheel spinners, etc.) to be reflected towards the eye of the observer. The amount of reflected light is greater than the amount of light from the lighting element that is directed away from the wheel surface.

Wheel lighting, illumination, or combination thereof offers aesthetical flexibility. While the remainder of the description herein will refer to a lighting/illumination system, it is to be understood that such nomenclature may be used to describe a wheel lighting system (including a wheel mounted lighting unit, "WMLU"), a wheel illumination system (including a wheel mounted illumination unit, "WMIU"), or a combination thereof (wheel mounted illumination and lighting system, "WMI/LU").

The salient feature of an embodiment is that the wheel lighting and/or illumination features can be controlled wirelessly manually by the, for example, driver or automatically by, for example, connection with turn signals, brake lights, emergency blinkers, fog lights, and back-up signals. The wireless control allows increased control over the lighting/illumination while overcoming problems associated with directly linking (i.e., a wired connection between) control hardware to the wheel lighting/illumination system. The wireless control may be either unidirectional or bi-directional. Each will be discussed in turn.

For a unidirectional system the transmitter conveys (or multiple transmitters convey) commands to each wheel's power, control, and monitoring ("PCM") subsystems via a wireless link (e.g., a radio frequency, or "RF" transmission) to each wheel's receiver. The receiver processes the waveform and presents digital information to the PCM subsystem. In an embodiment, The PCM subsystem frames the digital information and identifies the commands and the target address embedded in the digital stream. For the commands matching its address (or, for example, a broadcast address to select all PCMs on the vehicle), the PCM subsystem responds to those commands by initiating the appropriate action, for example by driving the appropriate amount of current to the selected lighting element array or arrays to control the lighting/illumination scheme. To enable the independent control of each individual wheel, each PCM may further have its own unique ID or address (e.g., a hardwired address in the PCM using a unique number system established at the time of manufacture or a manually programmable switch or switches). The WMI/LU IDs are useful if one wishes to control or monitor conditions at a specific wheel. For example, if the extended signaling feature intends to blink the left front WMI/LU, it would be necessary to send a signal intended for this unit only.

It is recognized that such an addressing system may lead to operational problems from normal servicing of a vehicle. For example if during "tire rotation" the WMI/LU IDs are not properly remapped to the correct physical location then it would be possible to have incorrect signaling indicators (e.g., the left turn signal controlling the WMI/LUs on the right side of the vehicle). A solution to such a problem is to place additional transceivers on the chassis near each wheel. For example the additional transceivers may be located in the wheel wells. There are a variety of methods to insure that the WMI/LU only responds to commands from the chassis based transceiver closest to it based on, among other metrics, relative signal strength and round trip signal delay. Another solution is to employ an onboard triangulation system that can determine the location of each WMI/LU.

The PCM subsystem further includes a energy source for both the lighting element array or arrays and the elements of the PCM subsystem that require an energy source. In an embodiment, the energy source is a battery. In another embodiment, the battery is rechargeable via a connection to an external energy source (e.g., an energy source that plugs into a wall outlet). The rechargeable battery may also be recharged with a generator coupled to the rotating reference frame of the wheel such that wheel rotation generates energy.

FIG. 1 illustrates an embodiment a wheel mounted lighting/illumination unit with unidirectional control. The WMI/IU 100 contains an antenna 140 coupled to a receiver 110. The receiver 110 is coupled a PCM subsystem 120 as described above. The PCM subsystem 120, having received a command from the receiver 110, controls the lighting element ("LE") array. The LE array 130 can contain any number of lighting elements, lighting element styles, and colors, and may be configured to light and/or illuminate the wheel. A tachometer 150 may be coupled to the PCM subsystem 120 to enable the PCS subsystem 120 to detect, for example, whether or not the vehicle to which the WML/IU 100 is attached is in motion and/or at what rate the wheel is rotating. The tachometer 150 may alternatively be wirelessly coupled to the PCM subsystem 120 through the receiver 110. The PCM subsystem 120 may further include sensors to make the same determination as to whether or not the vehicle to which the WML/IU 100 is attached is in motion and/or at what rate the wheel is rotating.

As noted, the WML/IU 100 may include an on-board tachometer or connection to the vehicle's existing tachometer, as illustrated by tachometer 150, to detect if the vehicle is moving and/or at what rate the wheel is rotating. The PCM subsystem 120 may further use the tachometer 150 signal (or its own sensor signal) to time the signal to the LE array 130, for example, to strobe the lighting elements. A strobe mode drives the LE array 130 in the WML/IU 100 by a periodic waveform that may be synchronized to the rotation of the wheel (e.g., by connection to the tachometer 150) or may be free-running. Alternatively the signal to the lighting elements may be turned off by a cab transmitter via a timeout circuit initiated by any one of a number of possibilities including ignition off, absence of motion in the cab, and other similar initiating events.

The WML/IU 100 may further have ports that can interface to a PC or similar electronic device to download control schemes. For example, it may be desirable to provide a plurality of control schemes (e.g., alternative strobe modes, illumination and lighting combinations, and lighting element intensity control) in the form of computer readable media to improve the level of lighting/illumination customization without requiring the vehicle mounted system to store all possible control schemes. In this way, an installer can download a subset of the control schemes to the lighting/illumination system to best customize a vehicle. The downloading may further utilize the wireless link to the WML/IU 100. The wireless protocol would include commands to reprogram the user accessible features. These command sets could further be restricted such that the user could not change certain feature sets that violate local vehicle code regulations.

Figure 2:
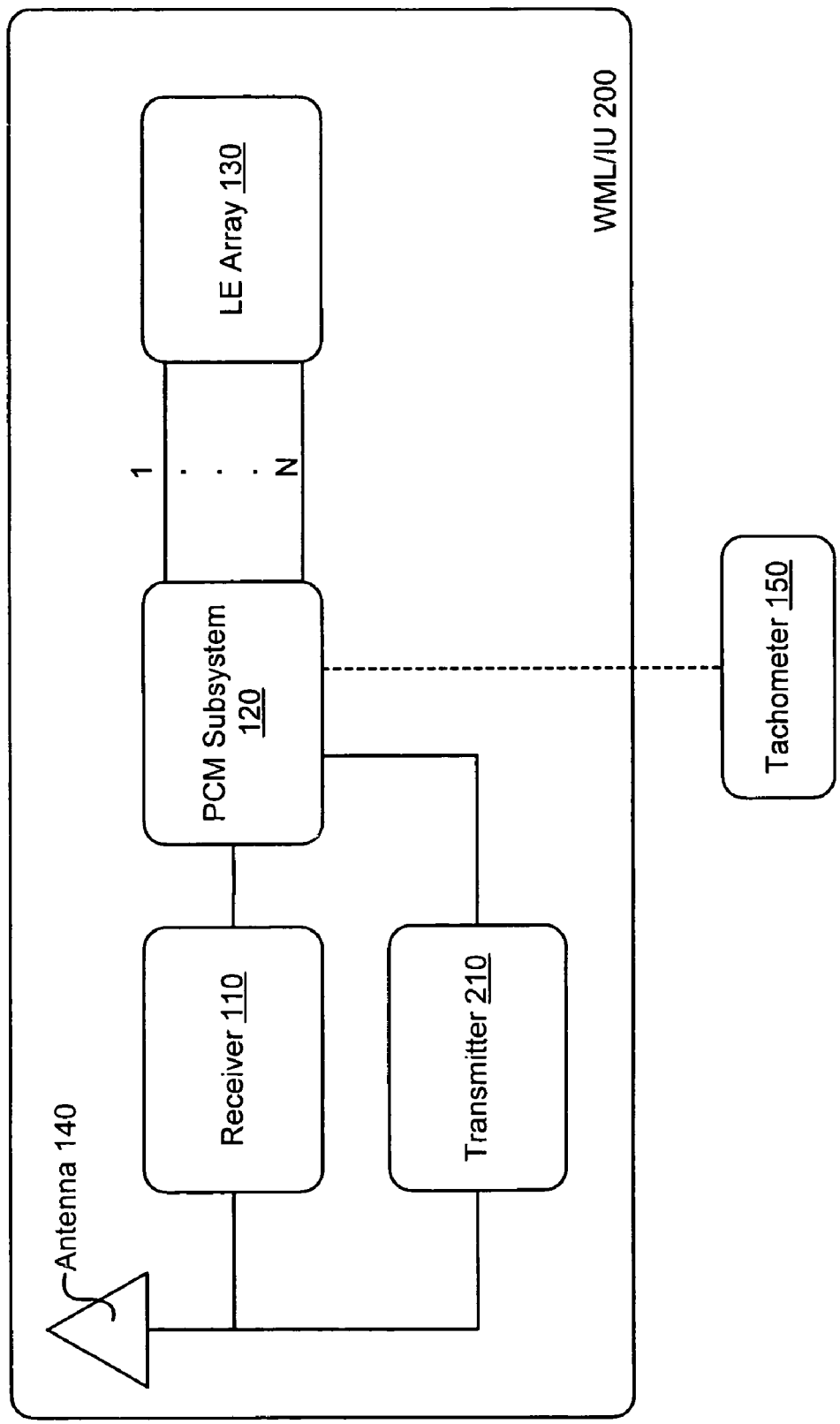
FIG. 2: block diagram an embodiment of a wheel lighting/illumination unit with bi-directional wireless control

FIG. 2 illustrates a bi-directional WML/IU 200 that can contain any elements as described with reference to WML/IU 100 with the addition of a transmitter 210. The operation from the off-wheel transmitter to the on-wheel receiver is the same for both the unidirectional and bi-directional wheel lighting/illumination systems, and has been described above with reference to WML/IU 100. The bi-directionality of WML/IU 200 adds a return path from an on-wheel transmitter 210 to an off-wheel receiver. The return path can be used to carry many types of information. The information may be gathered by a polling procedure whereby the off-wheel transmitter(s) interrogate each wheel independently or the information may be driven in an interrupt mode from the on-wheel transmitter 210 to the off-wheel receiver in the case of urgent information (e.g., detection of curb within allowed distance from the wheel mounted lighting/illumination system, low battery, and any other instance where rapid communication of urgent information would be desirable). Additionally, the return path can be used to verify that information sent by the off-wheel transmitter was properly received at the on-wheel receiver 110. Likewise, when information is sourced by the bi-directional WML/IU 200, the verification process is in reverse, in that the off-wheel receiver must send back information to the WML/IU 200 acknowledging proper receipt of information.

Figure 3:
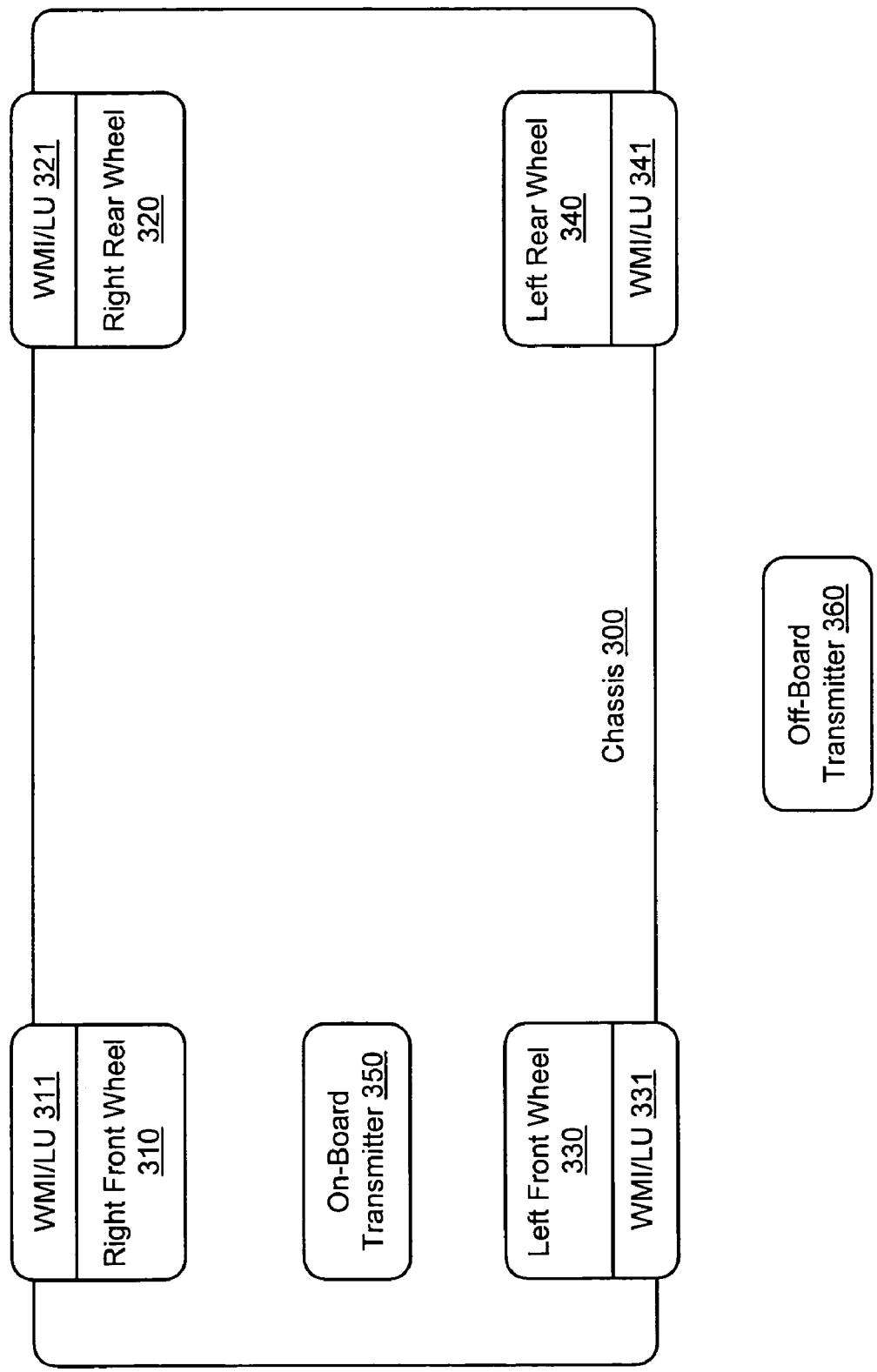
FIG. 3: block diagram of a vehicle utilizing an embodiment of a wheel lighting/illumination system with wireless control

FIG. 3 illustrates a chassis 300 of a vehicle containing a set of wheel mounted lighting/illumination units. The right front wheel 310 contains WML/IU 311. The right rear wheel 320 contains WML/IU 321. The left front wheel 330 contains WML/IU 331. The left rear wheel 340 contains WML/IU 341. Each WML/IU may be unidirectional or bi-directional. In an embodiment, the lighting elements are LEDs and of a single color on all of the wheels. For example, each wheel may contain 12 monochromatic LEDs. In another embodiment, the lighting elements have multiple colors. There may be multiple off-wheel transmitters. For example, one transmitter may be a portable handheld unit, for example a key chain transmitter, as illustrated by off-board transmitter 360. Another unit may be mounted in the cab of the vehicle as illustrated by on-board transmitter 350. The wireless link may further be coded to ensure that the receiver processes commands from the proper source as introduced above and that each WML/IU can be controlled as a set or individually. For example, the coded signal may prevent unwanted control or interference between WML/IU control signals of two vehicles so equipped adjacently located. The signal coding scheme can be any coding scheme well known in the art to distinguish, separate, or otherwise make unique signals from different sources. In an embodiment, it is a rolling code or code hopping scheme.

Figure 4:
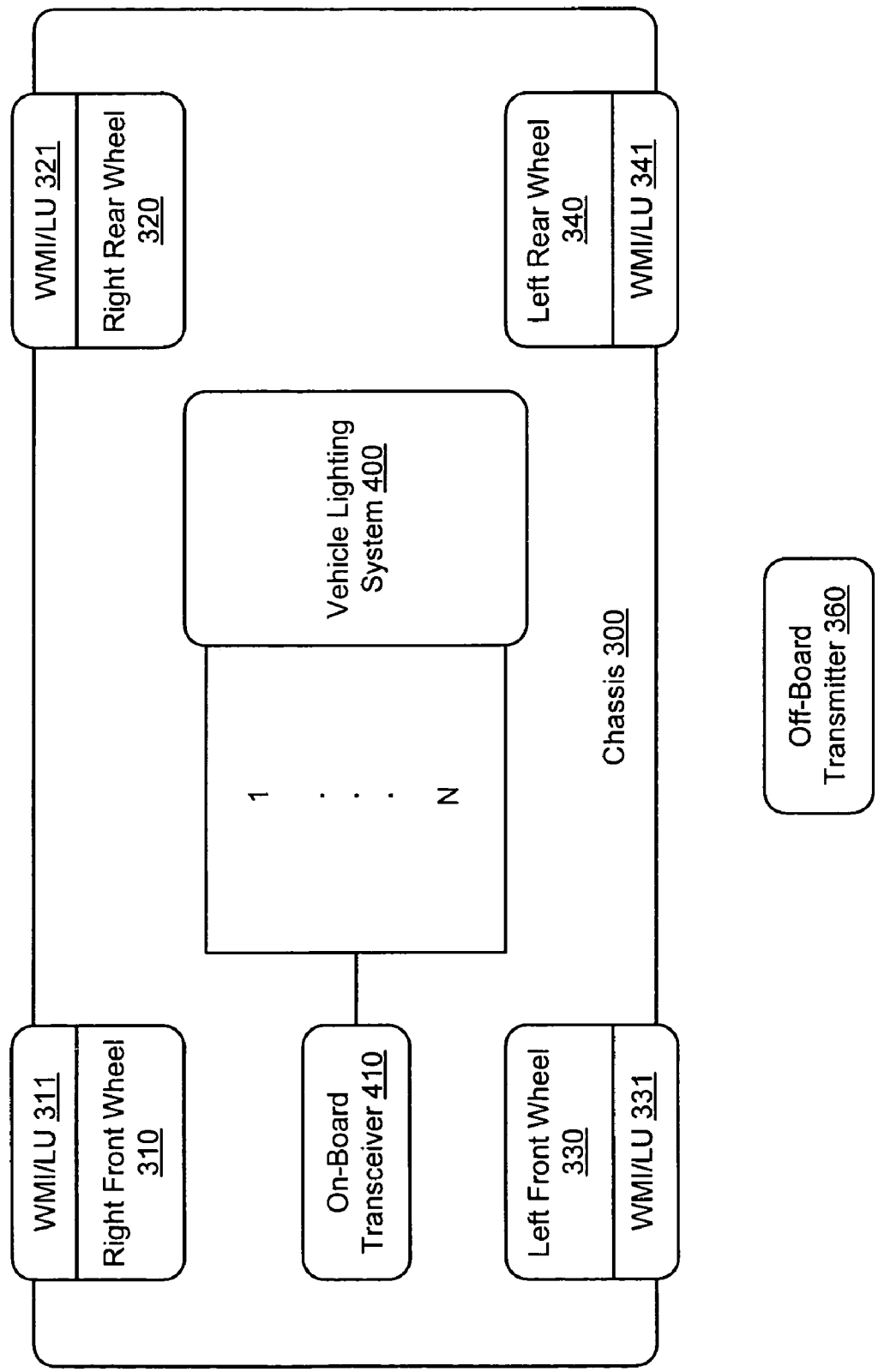
FIG. 4: block diagram of a vehicle utilizing an embodiment of a wheel lighting/illumination system with wireless control and extended signaling

FIG. 4 illustrates an embodiment of the invention adding the automatic control of certain lighting and/or illumination functions to enhance the existing signaling capabilities of the vehicle. The cab mounted on-board transceiver 410 controlling WML/IUs 311, 321, 331, and 341 has access to the vehicle lighting system 400. For example, a signal from the vehicle lighting system 400 may be a headlight signal, a high-beam headlight signal, a brake signal, a turn signal, an emergency light signal, a back-up signal, a fog lamp signal, or any other signal for which the extended signaling capabilities of an embodiment of the invention would be desirable. By example, rear wheels 320 and 340 may contain an additional array of red lighting elements. If the on-board transceiver 410 detects a brake signal from the vehicle lighting system, it can then direct the rear wheels 320 and 340 to energize the additional array of red lighting elements to extend the signaling capability of the brake signal. It is to be understood that both on-board transmitter 350 and on-board transceiver 410 could both couple to the vehicle lighting system 400 to control the set of WMI/Lus installed on the chassis 300. Transceiver 410 and transmitter 350 operate with bi-directional and unidirectional WMI/LUs respectively. In an embodiment, the transceiver 410 and bi-directional WMI/LUs create a return path for the control signal such that the transceiver 410 can confirm certain signaling functions.

A command set for an embodiment utilizing monochromatic lighting elements may be as follows and may be controlled by either manually by the handheld or cab mounted transmitter or automatically:

1-a) Turn on all lighting elements
1-b) Turn off all lighting elements
2-a) Activate strobe mode
2-b) Deactivate strobe mode It is to be understood that the commands can operate individually or in combination. For example, after the lighting elements have been turned on, the strobe mode may be turned on and off while the lighting elements remain energized.

In another embodiment, instead of monochromatic lighting elements, each wheel has lighting elements with a plurality or colors. It is to be understood that the color of the lighting element may be created by the intrinsic properties of the lighting element (e.g., an LED that creates a particular color based on its semiconductor bandgap) or by utilizing a filter, gel, or other similar device or mechanism that alters or enhances the color of the lighting element as visible to an observer. In an embodiment the lighting elements are LEDs and are composed of, for example, 12 yellow LEDs, 12 green LEDs, 12 blue LEDs and 12 white LEDs. Either transmitter (cab mounted or handheld) can source the following commands manually or automatically as noted above:

1-a) turn on all blue lighting elements.
1-b) turn off all blue lighting elements
2-a) turn on all yellow lighting elements
2-b) turn off all yellow lighting elements
3-a) turn on all white lighting elements
3-b) turn off all white lighting elements
4-a) turn on all green lighting elements
4-b) turn off all green lighting elements
5-a) turn on all lighting elements
5-b) turn off all lighting elements
6-a) activate strobe mode
6-b) deactivate strobe mode The cab transmitter can source the following additional commands if the wheel mounted lighting/illumination units can be individually controlled, both as to location and lighting element set, as described above:

1-a) turn on front axle blue lighting elements.
1-b) turn off front axle blue lighting elements
1-c) turn on rear axle blue lighting elements
1-d) turn off rear axle blue lighting elements
1-e) turn on blue lighting elements on left side wheels.
1-f) turn off blue lighting elements on left side wheels
1-g) turn on blue lighting elements on right side wheels
1-h) turn off blue lighting elements on right side wheels
2-a) turn on front axle white lighting elements.
2-b) turn off front axle white lighting elements
2-c) turn on rear axle white lighting elements
2-d) turn off rear axle white lighting elements
2-e) turn on white lighting elements on left side wheels.
2-f) turn off white lighting elements on left side wheels
2-g) turn on white lighting elements on right side wheels
2-h) turn off white lighting elements on right side wheels
3-a) turn on front axle yellow lighting elements.

3-b) turn off front axle yellow lighting elements
3-c) turn on rear axle yellow lighting elements
3-d) turn off rear axle yellow lighting elements
3-e) turn on yellow lighting elements on left side wheels.
3-f) turn off yellow lighting elements on left side wheels
3-g) turn on yellow lighting elements on right side wheels
3-h) turn off yellow lighting elements on right side wheels
4-a) turn on front axle green lighting elements.
4-b) turn off front axle green lighting elements
4-c) turn on rear axle green lighting elements
4-d) turn off rear axle green lighting elements
4-e) turn on green lighting elements on left side wheels.
4-f) turn off green lighting elements on left side wheels
4-g) turn on green lighting elements on right side wheels
4-h) turn off green lighting elements on right side wheels
5-a) turn on the red lighting elements on the rear axle
5-b) turn off the red lighting elements on the rear axle While the commands have been listed as finite sets, it is important to note each set is exemplary and not intended to be exclusive. Rather, additional combinations of commands are available to incorporate the full functionality of the wheel lighting/illumination system as described with reference to the embodiments above.

It is also important to note that certain lighting element colors, intensities, or strobing may be regulated by local vehicle code. Local vehicle code may permit only a certain subset of colors or intensities to be used, for example, by a moving vehicle or a stopped vehicle. For such control of the lighting elements, the wheel lighting/illumination system may be linked to the vehicle's speedometer, tachometer, or may contain its own sensors (on the wheel or centralized on the chassis) to determine whether or not the vehicle is moving. The wheel lighting/illumination system may further include a timing circuit to condition the access to light colors, intensities, or strobing. For example, a moving vehicle may have access to only a limited set of colors, intensities, and strobing schemes. A stopped vehicle may have access to additional colors, intensities, and strobing schemes. In heavy traffic or at a stoplight the timing circuit may delay the access to the additional features to prevent their use during temporary stops. For example, the timing circuit may require a delay exceeding a certain threshold (e.g., 3 minutes) to ensure that the car is parked rather than temporarily stopped. The specifics of the local vehicle code regulations may be incorporated into computer readable media to download to the wheel lighting/illumination as described above so that an installer can ensure their vehicle complies with local regulations.

It is also understood that the communication between transmitter and receiver, to and from the wheel, is not restricted to wireless communication rather includes a broader set of physical layer communication methods. This broader set of communication includes, but is not limited to, the electrical commutation of the signals to and from the rotating wheel and the non-rotating chassis.

It is also recognized that the WMI/LUs may be programmed or expanded to upgrade its feature set. For example, the customer may initially purchase a unidirectional transmitter with a multi-color set of WMI/LUs. At a later date that customer may wish to upgrade to a bi-directional transceiver that offers extended signaling (turn signals, brake signals, etc) as described with reference to FIG. 4. The installer may have access to a larger command set than the user's wireless control command set to program the WMI/LUs. The installer could thereby upgrade the user's WMI/LU command set for aesthetics, safety, and/or to comply with local regulatory rules.

It is finally recognized that although an embodiment has been described with reference to a vehicle with four wheels, any number or type of wheels can incorporate wheel lighting and/or illumination. For example, the wheel lighting and/or illumination of an embodiment can be part of a wheel or wheels for a passenger automobile, trailer, motorcycle, recreational vehicle, truck tractor and/or semitrailer, or any other vehicle, both on-road and off-road, with any number of wheels.

One skilled in the art will recognize the elegance of the disclosed embodiment in that it improves the ability with which wheel lighting and illumination systems can be used for aesthetic and safety purposes.

What is claimed is:

1. An apparatus comprising:
a plurality of lighting elements coupled to a wheel in the rotating reference frame of the wheel;
a control system coupled to the lighting elements, the control system identified by an address; and
a receiver coupled to the control system to receive a signaling instruction from a transmitter coupled to a vehicle lighting system, the control system to direct power to the lighting elements according to the signaling instruction, where the signaling instruction includes the address.

2. The apparatus of claim 1 wherein the signaling instruction is a wireless signaling instruction from the transmitter coupled to the vehicle lighting system.

3. The apparatus of claim 1 wherein the signaling instruction is commutated from the transmitter coupled to a vehicle lighting system.

4. The apparatus of claim 1 wherein the lighting elements are organized into a set of lighting elements configured to light the wheel and another set of lighting elements configured to illuminate the wheel.

5. The apparatus of claim 4 wherein the set of lighting elements to light the wheel is further configured to be viewed directly by an observer substantially without an optical path impairment and the set of lighting elements to illuminate the wheel is further configured to reflect an amount of light from a surface of the wheel greater than an amount of light directed away from the surface of the wheel by the set of lighting elements to illuminate the wheel.

6. The apparatus of claim 5, the control system to control the set of lighting elements configured to light the wheel and the set of lighting elements configured to illuminate the wheel independently.

7. The apparatus of claim 1, an element of the vehicle lighting system selected from the group consisting of a headlight signal, a high-beam headlight signal, a brake signal, a turn signal, an emergency light signal, a back-up signal, a fog lamp signal, and a combination thereof.

8. The apparatus of claim 1 further comprising an on-wheel transmitter coupled to the control system to transmit a wireless control signal and a signaling transceiver coupled to a vehicle lighting system to communicate the signaling instruction to the control system and to receive, from the on-wheel transmitter, verification of the control system's receipt of the signaling instruction.

9. An apparatus comprising:
a plurality of lighting elements coupled to a wheel in the rotating reference frame of the wheel;
a control system coupled to the lighting elements, the control system identified by an address; and
a receiver coupled to the control system to receive a wireless control signal, the control system to direct power to the lighting elements according to the wireless control signal where the wireless control signal includes the address;

wherein the lighting elements are configured to illuminate the wheel.

10. The apparatus of claim 9 further comprising a set of lighting elements configured to be viewed by an observer substantially without an optical path impairment.

11. The apparatus of claim 10 further comprising a signaling transmitter coupled to a vehicle lighting system to communicate the wireless control signal to the control system.

12. The apparatus of claim 11, an element of the vehicle lighting system selected from the group consisting of a headlight signal, a high-beam headlight signal, a brake signal, a turn signal, an emergency light signal, a back-up signal, a fog lamp signal, and a combination thereof.

13. The apparatus of claim 9 further comprising an on-wheel transmitter coupled to the control system to transmit another wireless control signal.

14. The apparatus of claim 13 further comprising a signaling transceiver coupled to a vehicle lighting system to communicate the wireless control signal to the control system and to receive, from the on-wheel transmitter, verification of the control system's receipt of the wireless control signal.

15. The apparatus of claim 9 further comprising a motion sensor coupled to the control system to detect if the wheel is in motion.

16. The apparatus of claim 15 wherein the motion sensor is a tachometer.

17. An apparatus comprising:
a plurality of wheel-mounted units, each wheel-mounted unit including
a plurality of lighting elements coupled to a wheel in the rotating reference frame of the wheel;
a control system coupled to the lighting elements;
a receiver coupled to the control system to receive a control signal including an address identifying the control system.

18. The apparatus of claim 17, wherein the control signal is wireless.

19. The apparatus of claim 18, wherein the wireless control signal is coded.

20. The apparatus of claim 17, wherein the control signal is commutated.

21. The apparatus of claim 17 wherein each address is substantially unique.

22. The apparatus of claim 21, each wheel-mounted unit to be independently controlled based on its substantially unique address.

23. The apparatus of claim 22 wherein the lighting elements are organized in a plurality of sets and wherein a set is independently controlled.

24. The apparatus of claim 17 wherein the lighting elements are selected from the group consisting of light emitting diodes, lasers, gas discharge lights, filament bulbs, and a combination thereof.

25. The apparatus of claim 24 wherein the lighting elements are monochromatic.

26. The apparatus of claim 24 wherein the lighting elements are polychromatic.

27. The apparatus of claim 24 wherein a color of a lighting element is adjusted by a filter.

28. The apparatus of claim 17 further comprising a signaling transmitter coupled to a vehicle lighting system to communicate a signaling instruction to each control system.

29. The apparatus of claim 28, an element of the vehicle lighting system selected from the group consisting of a headlight signal, a high-beam headlight signal, a brake signal, a turn signal, an emergency light signal, a back-up signal, a fog lamp signal, and a combination thereof.

30. The apparatus of claim 18 further comprising an on-wheel transmitter coupled to the control system of a wheel-mounted unit to transmit another wireless control signal.

31. The apparatus of claim 30 further comprising a signaling transceiver coupled to a vehicle lighting system to communicate a signaling instruction to the control system of a wheel-mounted unit and to receive, from the on-wheel transmitter of a wheel-mounted unit, verification of the control system's receipt of the signaling instruction.

32. The apparatus of claim 17, wherein the lighting elements are further configured such that an amount of light from the lighting elements reflected from a surface of the wheel is greater than the amount of light from the lighting elements directed away from the surface of the wheel.

33. The apparatus of claim 32 further comprising a set of lighting elements configured to be viewed by an observer substantially without an optical path impairment.

34. A method comprising:
receiving, by a receiver coupled to a control system, a coded wireless control signal including an address identifying the control system;
controlling, by the control system, a plurality of lighting elements coupled to the control system in response to the coded wireless control signal wherein the lighting elements are further coupled to a wheel in a rotating reference frame of the wheel.

35. The method of claim 34 further comprising lighting the wheel wherein the lighting elements are configured to be viewed directly by an observer substantially without an optical path impairment.

36. The method of claim 34 further comprising illuminating the wheel wherein the lighting elements are configured such that an amount of light from the lighting elements reflected from a surface of the wheel is greater than an amount of light from the lighting elements directed away from the surface of the wheel.

37. The method of claim 34 further comprising:
lighting the wheel wherein a set of the lighting elements is configured to be viewed directly by an observer substantially without an optical path impairment; and
illuminating the wheel wherein another set of the lighting elements is configured such that an amount of light from the other set of lighting elements reflected from a surface of the wheel is greater than an amount of light from the other set of lighting elements directed away from the surface of the wheel.

38. The method of claim 34 further comprising transmitting, from a signaling transmitter coupled to a vehicle lighting system, the coded wireless control signal.

39. The method of claim 34 further comprising transmitting, by an on-wheel transmitter coupled to the control system, another coded wireless control signal.

40. The method of claim 39 further comprising:
transmitting, from a signaling transceiver coupled to a vehicle lighting system, the coded wireless control signal; and
receiving, from the on-wheel transmitter, verification of the control system's receipt of the coded wireless control signal.

41. The method of claim 34 further comprising detecting motion of the wheel.

* * * * *